United States Patent [19]

McKinney

[11] Patent Number: 5,786,568

[45] Date of Patent: Jul. 28, 1998

[54] PROGRAMMABLE OVEN FOR COOKING HOLDING AND PROOFING COMESTIBLES

[75] Inventor: Eugene F. McKinney, Brunswick, Ohio

[73] Assignee: Leonhard May, Royalton, Ohio

[21] Appl. No.: 873,320

[22] Filed: Jun. 11, 1997

Related U.S. Application Data

[63] Continuation-in-part of Ser. No. 391,412, Feb. 16, 1995, Pat. No. 5,653,905.

[51] Int. Cl.⁶ .............................. A47J 27/00; A21B 1/26; F27D 11/00
[52] U.S. Cl. .................. 219/400; 99/331; 99/468; 99/476; 219/407; 219/399; 219/409; 219/530
[58] Field of Search ............................ 99/325–333, 468, 99/476, 337, 338; 219/400, 402, 406, 407, 409, 399, 530, 540; 34/220

[56] References Cited

U.S. PATENT DOCUMENTS

| | | | |
|---|---|---|---|
| 2,494,903 | 1/1950 | Sheidler | 219/399 |
| 2,718,854 | 9/1955 | Michaelis | 99/331 X |
| 3,051,582 | 8/1962 | Muckler et al. | 219/386 |
| 3,197,185 | 7/1965 | Beattie | 99/468 X |
| 3,265,861 | 8/1966 | Perlman | 219/399 |
| 3,282,578 | 11/1966 | Ulbrich | 99/476 X |
| 3,760,155 | 9/1973 | Polanski | 219/399 |
| 3,816,704 | 6/1974 | Borom et al. | 219/530 |
| 4,160,152 | 7/1979 | Wightman et al. | 219/438 |
| 4,209,569 | 6/1980 | Brugger | 219/407 X |
| 4,629,866 | 12/1986 | Procter | 219/439 |
| 4,648,377 | 3/1987 | VanCamp | 126/21 A |
| 4,978,295 | 12/1990 | Vukovich, Jr. | 219/400 X |

Primary Examiner—Timothy F. Simone
Attorney, Agent, or Firm—Joseph H. Taddeo

[57] ABSTRACT

A holding oven designed for creating a natural convection current in the chamber of the oven, and constructed by fixing the heater element to a first material characterized by its high thermal conductivity for rapid build-up of thermal gradient into an insulated space, while that heater element is simultaneously in contact with a second material which is characterized by its high thermal capacitance for slowing thermal discharge upon repeated opening and closing of oven doors. The first material forms a heat conductor and the second material forms a heat sink and the heat conductor is adapted to maintain a safe holding temperature over a more extended period of time in a power off mode. An ergonomically designed operating panel provides an interactive intuitive method of programming the desired cooking sequences. Remote operation and programming is accomplished using preprogrammed software on a conventional home computer via a modem. Switch selections are monitored by a microprocessor which branches to the various preprogrammed functions. In addition, self-analysis and self-diagnostics aid the user in displaying a walk-back of the stored times and temperatures that occurred during an operating cycle before a power outage.

46 Claims, 7 Drawing Sheets

PROGRAMMABLE OVEN FOR COOKING HOLDING AND PROOFING COMESTIBLES

REFERENCE TO PREVIOUSLY FILED APPLICATIONS

This applications is a continuation-in-part of Utility patent application Ser. No. 08/391,412, filed Feb. 16, 1995, U.S. Pat. No. 5,653,905 for ROYALTON NATURAL AIR MOVEMENT SYSTEM, on behalf of inventor, Eugene F. McKinney.

FIELD OF THE INVENTION

This invention relates to ovens for heating and keeping foods warm, and more particularly to an improved holding oven that uses natural convection derived from a novel stabilized heat source.

The present invention is also directed to food ovens having programmable controllers, ones that are capable of performing up to three multi-functional modes of operation within one enclosure. The system provides automatic operation through a power failure or power outage even if its control means is interrupted during its programmed cycle. The system is capable of being remotely programmed and operated using a conventional home computer via its modem control port. Integrated within the one cabinet is a system for the roasting or baking, holding at temperature, or proofing of various food items.

BACKGROUND OF THE INVENTION

Prior oven designs use heaters which are either fastened to the walls or floor, or may even totally encompass the entire interior of the cabinet. All of these systems tend to create stagnant heat near the top of the cooking or heating chamber which just continues to get hotter, resulting in a large thermal gradient within the cabinet.

Positioning of heater elements and controls is generally dictated by whether the cabinet includes single or dual access doors as well as the fact that the heated air within the cabinet rises to the top. It has been found that convection heat flow is preferred for cooking purposes, since convection heat cooks the food more thoroughly and quickly, while radiant heat is used to store and tenderize food. Proofing is the process for adding dough and water during the cooking process to keep the dough from cracking when rising, and requires maintenance of a target temperature and humidity within the cabinet.

Many prior oven designs generally do not have an inner chamber thermal baffle to smooth out the flow of heat. Without the use of thermal baffles, the cycling of the thermostat causes wide fluctuations in the internal temperatures of the oven. During the thermal control process, the thermostat cycles between the high and low limits as it attempts to maintain an average cabinet temperature. These wide cyclic excursions in temperature accelerate the cooking at the peak temperatures and undercook at the valley temperatures, causing the foods being prepared to have a quality of having a dried out, overcooked exterior and an undercooked interior.

In these dry-type ovens, there is a constant interchange of moisture between the convection currents and the product being prepared. This constant interchange of moisture is caused by the controlling source of thermal energy having a lack of close control—by overshooting and undershooting the desired average controlled temperature. Ovens having wide cyclic temperature variations often remove too much moisture from the product being cooked at the peak temperature excursion and return less moisture at the valley of the temperature excursion. This fundamental loss of control produces a food product that is dry and tasteless, has much shrinkage and is tough and hard.

By providing a newly designed oven that minimizes the extreme temperature cyclic variations, the internal air within the cooking chamber holds the moisture and water vapor in equilibrium to provide the desired results. It is preferable to have an oven design that provides a uniform low thermal gradient across the exterior to the interior of the food product to produce a more favorable quality product that is more tasty and tender, and has less shrinkage.

These design considerations are further complicated by frequent opening and closing of the doors during use. Thus an ideal design would enable natural heat circulation; would reduce temperature variation within the cabinet; would allow ready access to the heaters for enhanced serviceability with reduced maintenance costs; and, would achieve the foregoing at greater efficiency by reduction in wattage used.

Another problem that is frequently encountered in these cooking and holding ovens is a simplified means of providing a multi-level, multi-functional preprogrammed control. Today, restaurants and other food preparers find it to their advantage to automate the cooking and preparation of foods by having less operator intervention. The apparatus and methods that are within the scope of the present invention also provide preprogrammed food processing cycles to set the event-time, the event temperature, and the time-at-temperature for each processing event. The automated operation is enhanced by providing the capability of remote programming and operation by using a conventional home computer.

Prior art devices are not calculated to attain these goals or, if so designed, have not attained them.

U.S. Pat. No. 2,718,854, to Michaelis, 1951, discloses a bake pan or oven deck to provide a diffuse heat to eliminate burned spots with decreased heat by conduction and increased heat by radiation.

U.S. Pat. No. 3,197,185, to Beattie, 1963, is a heat furnace directed to heat treatment of glass.

U.S. Pat. No. 3,282,578, to Ulbrich, 1966, represents a liner for a furnace or kiln to absorb thermal shock.

U.S. Pat. No. 3,327,041, to Clune, 1964, is a heat shield pack with cylindrical heat shields of spaced-apart heat shield leaves of refractory material.

U.S. Pat. No. 4,209,569, to Brugger, 1980, is an aluminum baking form coated with aluminum oxide and the method of making same.

U.S. Pat. No. 4,648,377, to Van Camp, includes a gas fired blower and an improved, bifurcated heat exchanger.

The firing chamber of U.S. Pat. No. 4,978,295, to Vukovich, Jr., 1990, includes an upper ventilation aperture and an exhaust fan.

Accordingly, there is a need for commercial baking ovens and holding ovens with a chamber which can rapidly achieve a predetermined temperature with improved temperature maintenance capacity through repeated opening and closing of the cabinet in ordinary use and when the oven is in a thermostatically controlled power off mode. A need also exists for commercial baking ovens and holding ovens that can maintain and hold an average cabinet temperature with a minimum of cyclic temperature excursion.

It is therefore a principal object of the invention to provide a holding oven incorporating a heat sink formed of a first material with high thermal capacitance for rapid build-up and slow discharge of heat into an insulated space and, further incorporating a heat conductor formed of a material with lower thermal capacity but having a thermal conductivity a multiple of four or greater times that of the first material.

Another object of the invention is to provide for natural heat circulation to diminish temperature variation and provide a radiant heat with convection heat flow within the cabinet.

Yet another objective is construction of an oven having better efficiency with reduced wattage per hour of use.

Still another objective of this invention is construction of a holding cabinet with heater elements positioned with consideration for either single or dual access doors, facilitating tear-down and serviceability of heaters, and resultant reduction in maintenance costs.

Yet still another objective of this invention is to provide a preprogrammed controller having a menu selection for simplified operation to lessen the need for operator intervention.

An additional objective of this invention is to provide remote programming and operation by using a typical home computer having pre-loaded software. Connection with the programmable oven controller is made via a modem.

A final objective of this invention is to provide a construction of a dual-walled holding cabinet that integrates the cyclic peaks and valleys of thermal energy to a smooth average to promote a more uniformly cooked or baked product by keeping the moisture content and water vapor in equilibrium.

Further objects and advantages of the invention will become apparent from the following detailed description of the preferred embodiments and from the accompanying drawings.

SUMMARY OF THE INVENTION

As such, the oven of the invention includes a thermal input means formed of one or more heater elements, generally a Nichrome wire wrapped around and insulated with mica, sheathed in a metal jacket, such as a Calrod unit, with capability to achieve temperatures up to 1,000° F. A mechanical attachment of heater element to cabinet is a clamp or hold-down plate formed of a first material having a high thermal capacity, which may be copper, brass, a steel alloy or stainless steel. The clamp contacts a lower surface of the heater, while the clamp further communicates with the cabinet inner skin or inner casing, generally of stainless steel, to form a heat sink of the unit. A UL standard insulation, between inner and outer casings of the oven, provides thermal resistance and augments thermal retention.

The clamp presses the upper surface of the heater element against a second material having relatively high thermal conductivity, copper, silver or aluminum, to form a heat conductor for rapidly conducting heat from the sealed metal sheathed heating element to the chamber inner walls. The conductor is formed of two opposed "L-shaped" pieces in upright position, each "L-shaped" piece having an upright leg portion and a contiguous foot portion. The "L-shaped" pieces are brought together and the feet portions thereof welded together to form a "U-shaped" section, the heat conductor.

Preferably, two heater elements, each positioned under the juncture of the foot and the leg of each "L" draws heat up the sidewall of the conductor, (leg of the "L"), but away from the central floor portion of the cabinet, since the foot portions of the "L-shaped" pieces are not one contiguous material although the foot portions are joined together in cabinet construction. This design results in creating a natural heat motion within the cabinet.

The heater and clamp or hold-down plates, so combined, prevents the heaters from bowing away from the conductor, while simultaneously having a mirror effect with reflection of heat to rapidly achieve and maintain a predetermined temperature and serve as a heat sink.

Because each heating element operates at about the same temperature, the thermal gradient between them is essentially zero, resulting in no flow of heat energy between them. This results in the heat energy to be rapidly conducted away from each of the heaters and up the sidewall of each conductor. Each "L-shaped" sidewall conduction member has an effective radiating area of almost the same area as each sidewall of the cabinet.

An inner chamber thermal baffle smoothes out the flow of heat into the oven chamber. Stainless steel is used in the construction of the enclosed inner oven chamber. The mass of the stainless steel chamber is about twice the mass of the "L-shaped" aluminum conductors. Because stainless steel has high resistivity and low conductivity, the flow of heat energy into the central portion of the oven is retarded.

This arrangement of having highly conductive "L-shaped" aluminum outer conductive panels rigidly coupled to a stainless steel inner chamber, smoothes out the thermal cycling of the thermostat. During the thermal control process, the thermostat cycles between the high and low limits as it attempts to maintain an average cabinet temperature. These wide cyclic excursions in temperature accelerate the cooking at the peak temperatures and undercook at the valley temperatures, which causes the foods being prepared to have a dried out, overcooked exterior and an undercooked interior.

Typically, there is a constant exchange of moisture between the convection air currents and the food product being cooked. This constant interchange of moisture is caused by the lack of tight control by overshooting and undershooting the desired average temperature.

Ovens having wide cyclic temperature variations often remove too much moisture from the product being cooked at the peak temperature excursion and return less moisture at the valley of the temperature excursion. This fundamental loss of control produces a food product that is dry and tasteless, has much shrinkage and is tough and hard.

By using this newly designed oven that reduces the extreme temperature cyclic variations, the internal air within the cooking chamber holds the moisture and water vapor in equilibrium to provide the desired results; a high quality product that is more tasty and tender, and has less shrinkage.

The apparatus and methods that are within the scope of the present invention also provides preprogrammed food processing cycles as applied to the improved programmable oven that can be programmed to operate unattended in real-time, from either its front panel or remotely via a modem. There are several self-analyzing functions that can be performed when using the front panel. The three modes of operation, such as cooking, holding at temperature, or proofing are integrated into a one-piece cabinet. A novel power management system stores into memory any power outages, their duration, along with the various internal cabinet temperatures. If a sustained power failure occurs, a beeping audible alarm sounds with a flashing front panel indicator that shows a power supply fault had occurred.

A preprogrammed microprocessor controls and monitors the selected cooking sequences. The operating sequences are interactively introduced into the computer's memory through the activation of the front panel controls. Several front panel indicators display the mode selected, along with the desired set temperature. In addition, the present temperature achieved, the time to start each mode, the duration at each mode, as well as the current status, are displayed. Closed loop control allows the controller to maintain the desired set temperature for the period entered into the front panel.

An alternate cooking mode is with the use of a probe inserted into the food item. In this mode of operation, a temperature probe is inserted into the frozen food product to sense the internal temperature of the food item. A controlled ambient air temperature thaws the food product. When the internal temperature of the food product reaches 45 degrees, the thawing cycle is considered complete, causing the cooking cycle to start.

There may be times when in the process of preparing and cooking food items that an intermittent power interruption or long term power outage occurs. If there is a power glitch or even a spike on the power line, the microprocessor reverts to a battery backup to preserve the contents of memory. Upon restoration of the power service, the program returns to the same mode of control as it was when the failure occurred and then resumes operation. A lithium battery provides the backup power source for the microprocessor and memory. It is sized so that it can provide a 5 year service life without need of replacement. Transient surge protection is provided at each input to suppress any extraneous noise, especially from power line surges and spikes.

If a long term sustained power outage happens, the cooking cycle may be interrupted which could manifest itself as an undercooked food item. Without an indicator that shows the cook that a power loss occurred, the operator has no particular insight that the food item may have to be cooked longer or perhaps even discarded should the outage be of a prolonged sustained nature.

For each occurrence of either a power failure or interruption, the time of failure and its duration are automatically stored in memory. By interrogating the front panel, the operator can display on demand either the time of failure or the duration of the outage.

In the event a power failure lasts less than 10 minutes, upon the restoration of power, the oven continues its operation at the point in its program where the power failure occurred. This is possible because of the insulation used in the construction of the oven chamber; there is minimal loss of heat within a 10 minute interval.

Should the duration of the power failure be greater than 10 minutes, an audible alarm that emits a beeping sound as well as an illuminated flashing panel light alerts the operator that a failure had occurred. When the power is off, depressing the reset button once will turn off the beeping sound and flashing light. When the power is on, the reset button must be depressed twice.

The self-analyzing feature of the present invention allows the user to explore the stored times and temperatures attained just at the instant of power outage and at the instant of power resumption. There are times when there may be multiple power interruptions, perhaps due to a tree limb falling across the wires. The present invention allocates sufficient memory to store these variables for later operator revue.

BRIEF DESCRIPTION OF THE DRAWINGS

Specific features of the invention will be better understood from the following detailed description when considered in connection with the accompanying drawings in which:

FIG. 3 is an electrically equivalent circuit for the invention indicating input heat flow with diagram elements shown as;

1. 117 Volt AC Source
2. Thermostat
3. Heater Sink
4. $M_1$—Heater Mounting Block
5. $R_1$—Thermal Resistance of Aluminum
6. $M_2$—Mass of the Aluminum Heat Conductor
7. $R_2$—Thermal Resistance of Stainless Steel
8. $M_3$—Mass of the Stainless Steel Inner Chamber
9. $R_3$—Insulation Thermal Resistance R22)

10. $M_4$—Mass of the Thermal Load
11. $R_4$—Thermal Resistance due to Convection

DETAILED DESCRIPTION OF THE PREFERRED EMBODIMENT

There are three different flow laws for heat, corresponding to three different heat processes. Associated with heat conduction is the name of Fourier, with heat convection is the name Newton, and with heat radiation are the names Stefan-Boltzmann.

Heat Transfer by Radiation

Figure 1:
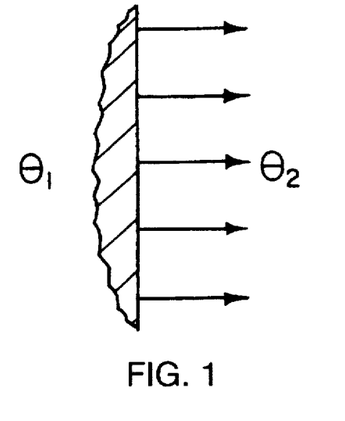
FIG. 1 is a diagram for Radiation Heat Flow.

Several designs used the principle of heat transfer by radiation. FIG. 1 shows a heated surface $\Theta_1$, that is losing heat by radiation to a region of lower temperature $\Theta_2$. The heat flow is given by the Stefan-Boltzmann law for surface radiation, which is:

$$Q = \sigma A \epsilon (\Theta_1^4 - \Theta_2^4) \text{ joules/sec}$$

where

Q=heat flow, joules/sec
σ=the Stefan-Boltzmann constant
=5.672×10⁻⁸ joules/m²-sec-deg⁴
ε=emissivity of the surface between 0 and 1)
A=surface area, m²
θ=temperature, deg K In a practical application, designs using the principle of radiation heat transfer, have large internal thermal gradients because of the radiation resistance. The radiation resistance is written approximately $$R = \frac{d\theta}{dQ} = \frac{1}{4A\sigma\epsilon\theta_a^3} \text{ deg-sec/joule}$$

where $\theta_a$ is the average of radiator and receiver temperatures. The radiation resistance varies inversely as the cube of the average temperature. The resistance as calculated from the above equation is not seriously in error when the source and receiver temperatures differ by a factor of two, but the error increases rapidly for greater differences.

Heat Transfer by Convection

Figure 2:
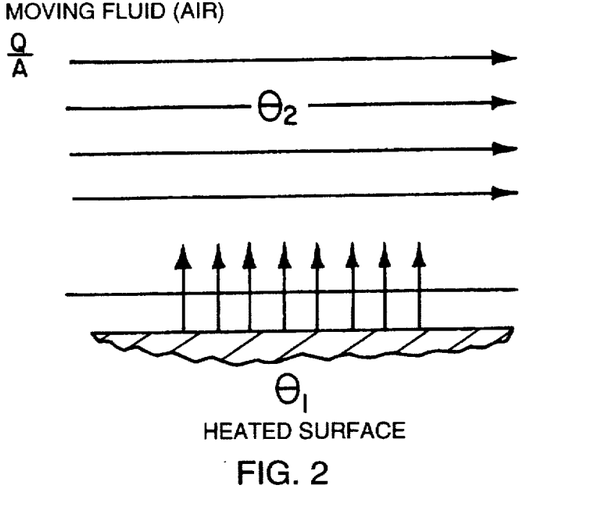
FIG. 2 is a diagram for Convection Heat Flow.

To consider those systems that use convection heat transfer, refer to FIG. 2 (which shows a fluid, either a liquid or gas, in either laminar or turbulent flow), $\Theta_2$, which flows across a heated surface $\Theta_1$, and thereby carries heat away from the heated surface. The region of the flowing liquid that absorbs or gives up the heat is the boundary layer. The convection heat transfer is given by Newton's law of "cooling," which is $$Q = h'A\ (\theta_1 - \theta_2) \text{ joules/sec}$$

where h' is the convection coefficient (joules/m²-sec-deg K). For a given state, h' is nearly constant and is not dependent upon the state of the fluid flow, whether it is laminar or turbulent. It is important to realize that the process by which heat is carried from the heated surface to the fluid is molecular conduction, and for this reason the process of heat conduction by convection is essentially the same as that by conduction. One may, in fact, relate the Newton law to the Fourier law in the fluid at the surface of contact of the fluid and the wall.

The thermal resistance due to convection is $$R = \frac{d\theta}{dQ} = \frac{1}{h'A} \text{ deg-sec/joule}$$

Heat Transfer by Conduction

In considering a heat conducting system, where the ends of a conducting substance of which are maintained at different temperatures, $\theta_1$, and $\theta_2$, by application of the Fourier law $$Q = \frac{kA}{L(\theta_1 - \theta_2)} \text{ joules/sec}$$

where

Q=heat flow, joules/sec
k=thermal conductivity, joules/meter-sec-deg
A=area normal to the heat flow, m²
L=length of conductor, m
σ=temperature, deg K.

The thermal resistance for a conducting substance is $$R = \frac{d\theta}{dQ} = \frac{L}{kA} \text{ deg-sec/joule}$$

The Royalton system is one that involves the transfer of heat from one substance to another. This is characterized by a system that has both resistance and capacitance. Substances that are characterized by resistance to heat flow have negligible storage of heat, and substances that are characterized by heat storage have negligible resistance to heat flow. There are many substances that satisfy the validity of such approximations. For example, substances as air, wood, cork, etc. possess high thermal resistance, but low thermal capacitance, whereas a block of aluminum or copper has a high thermal capacitance with a relatively low thermal resistance.

Thermal Capacitance

The thermal capacitance can be determined using the following relation $$C\frac{d\theta}{dt}\ Q \text{ joules/sec}$$

where

C=thermal capacitance, joules/deg
t=time, sec

The thermal capacitance is written directly as $$C = WC_p$$

where

W=weight of substance, kg
$C_p$=specific heat at constant pressure, joules/deg-kg.

The Royalton System

Figure 3:
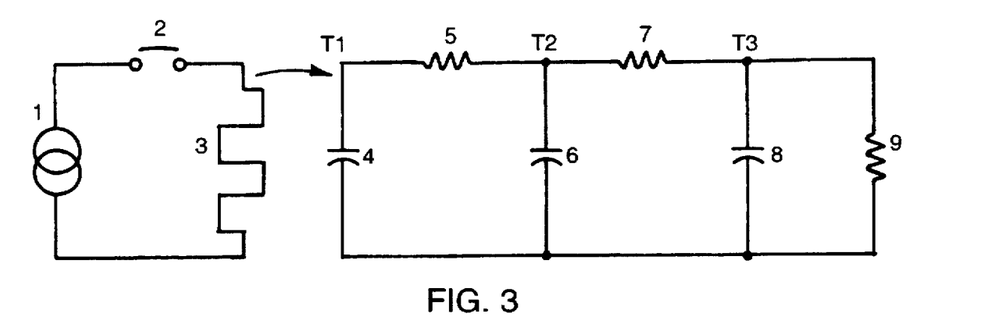
Figure 4:
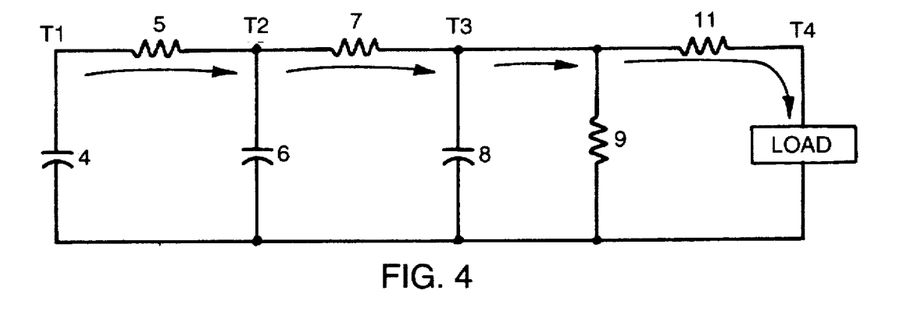
FIG. 4 is an electrically equivalent circuit for the invention in the power off mode, showing no input heat flow, but with heat load added.

The Royalton system can best be described in two electrically equivalent diagrams. The first diagram, FIG. 3, shows the application of a thermostatically controlled electrical energy source that provides the heat energy to the system. The second diagram, FIG. 4, shows the energy source removed with the heat load (food) placed within the chamber.

The specific heat of aluminum is
20° C.=0.214 cal/gm
100° C.=0.225 cal/gm
200° C.=0.248 cal/gm
The specific heat of iron is
20° C.=0.107 cal/gm
100° C.=0.115 cal/gm
200° C.=0.127 cal/gm
The conductivity of aluminum is
18° C.=0.480
100° C.=0.492
200° C.=0.550
The conductivity of steel is
18° C.=0.108
100° C.=0.107

Turning now to FIG. 3, the heater means or element 3 is controlled by thermostat 2 from the 117 VAC energy source 1. The heater element transfers heat directly to the hold-down plate 4, which plate is preferably stainless steel, such that the plate reflects heat back at the element with a mirror effect, whereby the element and plate form a heat sink for rapid increase of thermal energy. The heat sink of 3 and 4 further transfers heat to mass of aluminum or heat conductor, 6, via its thermal resistance 5. Because the aluminum is highly conductive and contains a relatively large mass, the temperature $T_2$ is just slightly lower than the heater assembly temperature $T_1$. The resistor 7 represents the thermal resistance of the stainless steel and is about 5 times greater in value. The value for capacitance 8 is about equal to that of the aluminum mass because the ratio of the specific heats is 2 to 1 and the weight of the steel cabinet is about twice the aluminum heat conductor. The value of resistor 9 is that of the glass wool insulation (R22), and is a very large value of resistance.

Once the system is stabilized at its operating temperature, the thermal load 10, usually preheated trays of prepared food, is stored in the cabinet and the power removed. This is best shown by the equivalent thermal diagram of FIG. 4. All of the stored thermal energy in elements 6 and 8 is transferred to the food via the natural convection currents as determined by the value assigned to resistor 11. As the temperature $T_4$ of the load 10 tends to decrease, the stored energy is transferred maintaining the food at a relatively constant temperature for long periods of time.

A target temperature within the cabinet may be designated by a food service company, standards and rules of the school, hospital or other institution using the oven or by the specific type of food within the oven itself. Most health department have minimum temperature requirements ranging from 140° F. to 160° F. Thus the thermostat control preferably includes ON and OFF MODES to achieve a target temperature within the cabinet of about 200° F.

Figure 5:
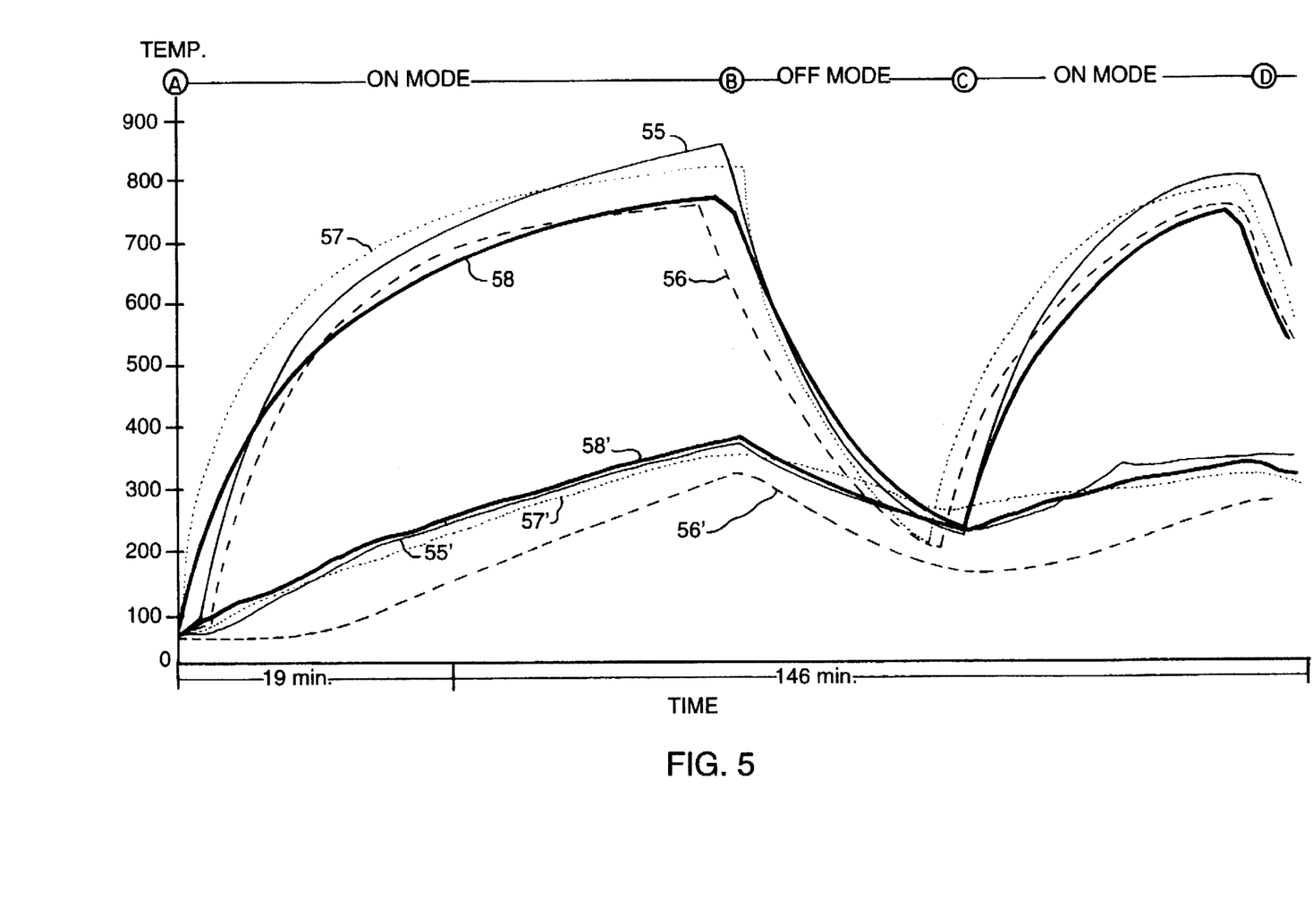
FIG. 5 is a graph for Test Results for heater temperatures for hold-down plates comprising respectively aluminum, 55, mild steel alloy, 56, copper, 57, and stainless steel, 58, taken from a first lead measuring heater element temperatures as a function of time; and, graph lines 55', 56', 57', and 58', for the respective materials, with temperatures taken from a second lead measuring concurrent temperatures within the oven chamber.

The chart of FIG. 5 graphs temperatures as a function of time to indicate test results on use of heater hold-down plates of various materials. Temperatures were taken from a first lead on the heater element, (higher temperature or line set), and a second lead from within the cabinet, (lower line set shown with numbers primed), during both the automatic thermostatically controlled ON MODE, (time interval A–B, top of chart), OFF MODE, (B–C), ON MODE, (C–D).

EXAMPLE I

A heat sink was constructed using a heater element comprising a mica jacketed Nichrome wire mechanically fastened to an enclosed heating cabinet by means of a hold-down plate under a lower surface of the heater, that plate formed of aluminum having the same length and width dimensions as the heater to restrict the heater element from bowing away from the cabinet at maximum heater element temperatures. The upper surface of the heater element of the heat sink thus formed was placed against an L-shaped aluminum mass, at the juncture of the upright leg portion of L-shaped aluminum heat conductor and the foot portion of aluminum conductor. The cabinet was equipped with an automatic thermostat controller with an ON MODE and an OFF MODE, adapted to achieve a target temperature within the cabinet of 200°. A first temperature lead was clamped between the aluminum hold-down plate and the heater for determining temperatures of the heater element over time; while a second temperature lead was positioned within the cabinet to record cabinet temperatures over a corresponding time. As such, the test run for use of a heater hold-down plate of aluminum produced the solid thin temperature line 55, for the heater element temperature and line 55' for the corresponding cabinet temperatures. The maximum heater element temperature was 850° F. with a corresponding maximum cabinet temperature of 380° F.

EXAMPLE II

The second test was run on the same cabinet, with the same temperature lead placements, using the same heater element under the same conditions of EXAMPLE I above, but with a hold-down plate comprising a mild steel alloy. As such, the test run for use of a heater hold-down plate formed of mild steel alloy produced the dashed temperature line 56, for the heater element temperature and line 56' for the corresponding cabinet temperatures. The maximum heater element temperature was 760° F. with a corresponding maximum cabinet temperature of 325° F.

EXAMPLE III

The third test was run on the same cabinet, with the same temperature lead placements, using the same heater element under the same conditions of EXAMPLES I and II above, but with a hold-down plate comprised of copper. As such, the test run for use of the copper hold-down plate produced the dotted temperature line 57, for the heater element temperature and line 57' for the corresponding cabinet temperatures. The maximum heater element temperature during use of the copper hold-down plate was 798° F. with a corresponding maximum cabinet temperature of 375° F.

EXAMPLE IV

The fourth test was run on the same cabinet, with the same temperature lead placements, using the same heater element under the same conditions of EXAMPLES I, II and III above, but with a hold-down plate comprised of stainless steel. As such, the test run for use of the stainless steel hold-down plate produced the heavy black temperature line 58, for the heater element temperature and line 58' for the corresponding cabinet temperatures. The maximum heater element temperature during use of the copper hold-down plate was 775° F. with a corresponding maximum cabinet temperature of 390° F.

Thus, FIG. 5 graphically demonstrates that heater element hold-down plates comprising stainless steel are preferable in constructing the heat sink for two reasons: 1) Because stainless steel has higher thermal capacitance and resistance, plates of stainless steel were found to discharge thermal energy more slowly in the power off mode; and, 2) The stainless steel plates produced higher cabinet temperatures [with] at lower heater element temperatures for reduced thermal trauma to the heater elements. Stated otherwise, hold-down plates made of stainless steel produced the highest cabinet temperature, 390° F., shown by heavy black temperature line, 58', consequent to a relatively low, maximum heater element temperature of 775°, heavy black line, 58, than the plates of aluminum, 55', 55, mild steel alloy, 56'.56, or copper, 57'.57.

The test results shown in the chart of FIG. 5 further indicate that the equipment having both ON and OFF MODES serves as a heat sink in the off mode, thus maintaining a safe holding temperature much longer than conventional heating methods while the heater element is off. When in use, the heat conductor/sink also serves to stabilize the equipment temperatures as the door or doors are constantly being opened and closed.

Figures 6, 7:
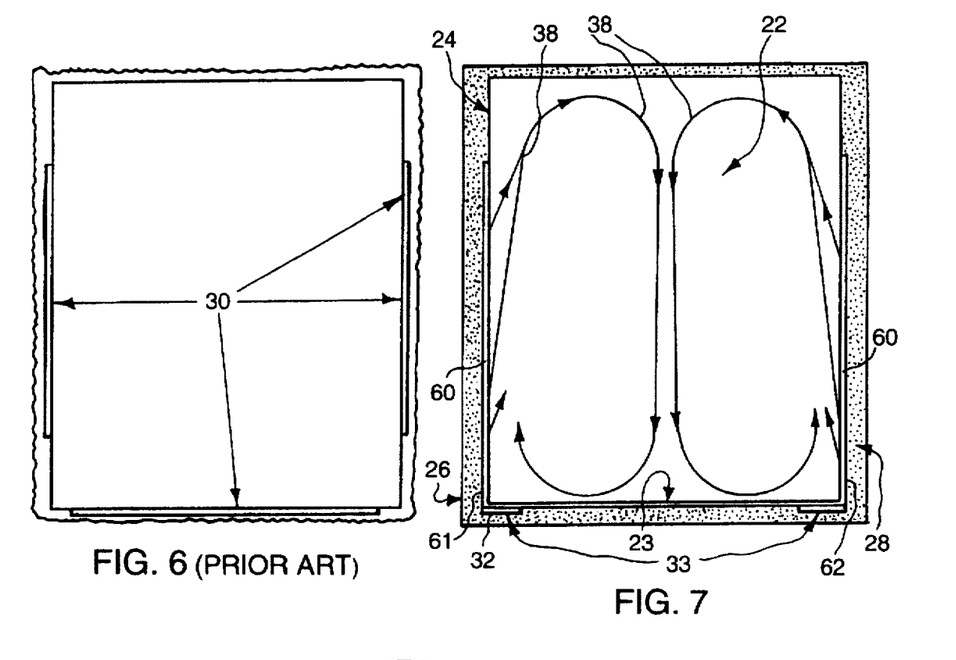
FIG. 6 is a perspective view of a prior art holding oven indicating heretofore prevalent positioning for heater elements in general.
FIG. 7 is a cut-away front plan for the oven of the present invention demonstrating heater elements with hold-down plates forming the heat sink, the heat conductor and natural air flow within the cabinet; and, FIG. 8 is a perspective view of the cabinet of the present invention showing the position of the heater element and the heat conductor wall.

FIG. 6 is a perspective view of a holding cabinet to indicate usual positioning generally prevalent for heater elements 30 in the prior art.

FIG. 7 is a front cut-away view of the Royalton cabinet 22 demonstrating the heater element 30 which is retained against aluminum conductor 60 by hold-down plate 32. The upright wall of the aluminum mass forming heat conductor 60 gives a natural convection heat flow 38 within the holding oven of the present invention.

FIG. 7 further indicates that the Royalton Natural Air Movement System also incorporates the laws of physics that:

a) A heated gas rises and cooler gases descend;
b) Stainless steel is characterized by low conductivity and high capacitance and positioning the hold down plate immediately adjacent to the heating element results in a mirror effect creating a heat sink, wherein the steel plate reflects the heat back which is then drawn off by the aluminum conductor;
c) Aluminum is characterized by high conductivity and more rapid thermal transmission which pulls heat from the heater element and thereby serves as a heat conductor.

Advantageous results are achieved by the heat repulsion or resistance of one material, the hold-down plate preferably formed of stainless steel on one surface of the heater element, and the thermal conductivity of a second material, a mass of aluminum comprised of L-shaped pieces 61,62 fastened together, are positioned adjacent the second surface of the heater element to draw heat away from the heater element and up the sidewalls of the cabinet. The unique use of the highly conductive and less conductive materials and relative positioning of the heater elements at the juncture of the leg and foot portions of each L-shaped aluminum piece, gives resultant natural heat circulation 38, better efficiency by use of less wattage per time unit, reduced temperature variation within the cabinet and enhanced serviceability with resulting lowered maintenance costs.

In FIG. 7, the oven of the invention 100 includes a thermal input means formed of one or more heater elements 30, generally a Nichrome wire [in a mica] wrapped upon a mica core, and then sheathed in a metallic jacket, with capability to achieve temperatures up to 1,000° F. Heater means or element 30 is mechanically affixed to cabinet 22 by hold-down plate 32 formed of a first material having a high thermal capacity, which may be a ceramic material, copper, brass, mild steel alloy, aluminum, or stainless steel. But in accord with the test results shown in FIG. 5 above, the hold-down plate 32 is preferably formed of stainless steel. The hold-down plate 32 contacts a lower surface of the heater element 30, to form heat sink 33. The heater means or heater element 30 and the hold-down plate 32, formed of stainless steel, a ceramic material, copper, brass, or a mild steel alloy, is also shown as heat sink 3,4 with resistance 7 for stainless steel, in FIG. 3. The hold-down plate 32 further communicates with the cabinet inner skin or inner casing 24, generally of stainless steel, to form a heat sink, (3,4 in FIG. 3), of the unit.

Reference to FIG. 7 indicates a UL standard insulation 28, between inner 24 and outer 26 casings of the oven, provides thermal resistance (11 in FIG. 4) to augment thermal retention.

The clamp or hold-down plate 32 further presses the heater element 30 against a second material having relatively high thermal conductivity, copper, silver or aluminum, (element 6 in FIG. 3), to form a heat conductor 60 for rapidly conducting heat from the Nichrome wire heater element 30 to the chamber inner walls 24.

FIG. 7 further shows that heat conductor 60 is formed of two opposed "L-shaped" pieces 61,62 in upright position. A heater element 30, positioned under the juncture of the foot and the leg of each "L" draws heat up the sidewall of the conductor 60, (leg of the "L"), but away from the central floor portion 23 of the cabinet, since the foot portions of the "L-shaped" pieces are not one contiguous material although the foot portions are joined together in cabinet construction. The fact that the lateral floor portions, (foot of each L), and sides, (leg of each L), of the cabinet are hottest to propel the thermal energy upward along the cabinet sides and downward along a central portion 23. This design results in creating a natural heat convection within the cabinet.

The heater and clamp, so combined, prevent the heater from bowing away from the conductor, while simultaneously having a mirror effect with reflection of heat to rapidly achieve the predetermined temperature.

Figure 8:
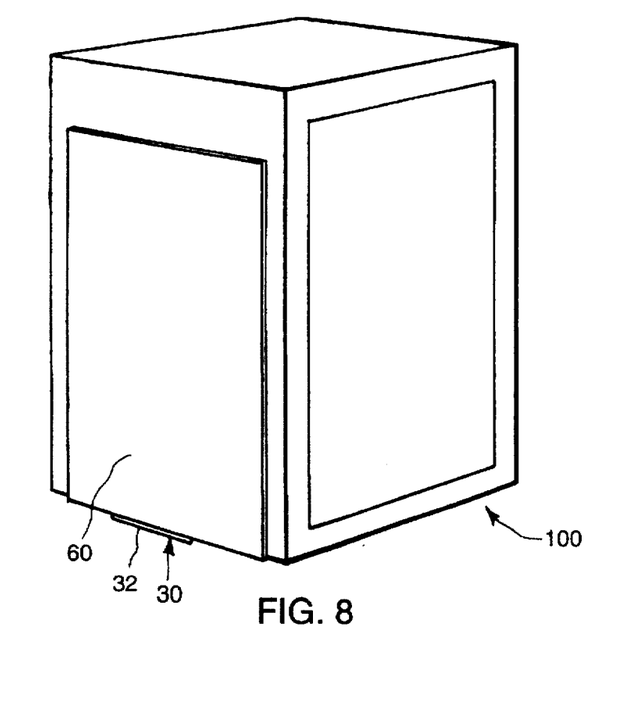

FIG. 8 is a perspective elevation of a heater cabinet of the subject invention showing the heater element 30 positioned against the aluminum mass at the juncture of the upright leg portion 60 of the L-shaped piece and the contiguous foot portion of the L-shaped piece which form the heat conductor of the present invention.

The thermal gradient between the two heaters is essentially zero because each heating element operates at about the same temperature, which results in a negligible flow of heat energy between them. This results in the heat energy to be rapidly conducted away from each of the heaters and up the sidewall of each conductor. Each "L-shaped" sidewall conduction member has an effective radiating area of almost the same area as each sidewall of the cabinet.

Each "L-shaped" sidewall is mechanically coupled to the interior oven chamber that is made of stainless steel. The inner chamber thermal baffle smoothes out the flow of heat into the oven chamber. The thermostat which controls the operating temperature within the oven chamber has a temperature differential that approximates plus or minus 15 degrees. These cyclic variations of overshooting the desired temperature by 15 degrees and undershooting the desired temperature by 15 degrees causes the food product being cooked to be overcooked at the peak overshoot and undercooked at the peak undershoot. The constant repetition of cyclically overcooking and undercooking results in a dried out, tasteless food product. During the process of constantly overheating and underheating the internal temperature, there is an unequal distribution moisture within the food product and within the cooking chamber.

Figure 9:
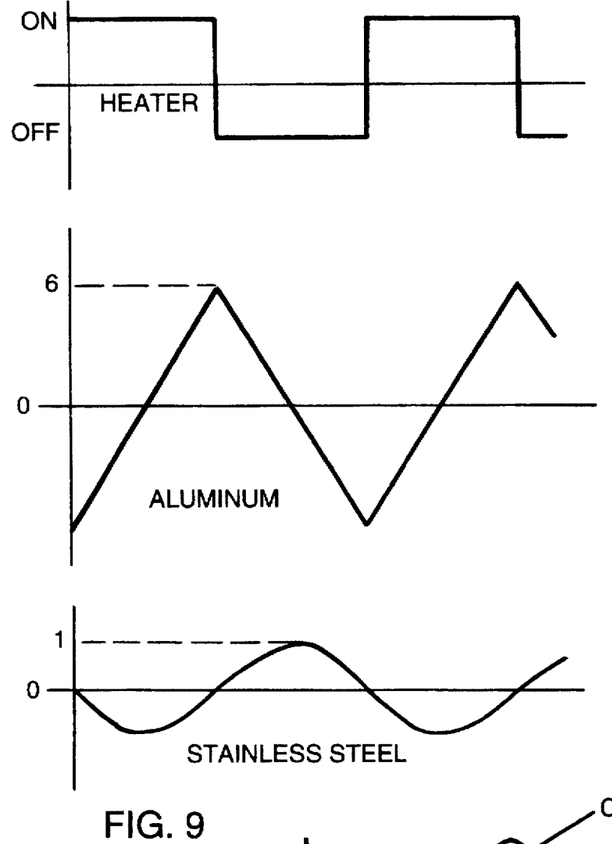
As shown in FIG. 9, the amplitude about the mean controlled temperature is reduced by approximately one-sixth that of using aluminum by itself.

By using an inner chamber that is made of stainless steel and directly coupled to the aluminum "L-shaped" conducting panels, these problems can be eliminated. Because the mass of the stainless steel chamber is approximately twice that of the conducting panels, and because it is a relatively poor conductor of thermal energy, it effectively filters out the overshooting and undershooting about the desired temperature. This novel construction serves to thermally integrate and smooth the flow of thermal energy to the interior of the oven chamber. As shown in FIG. 9, the amplitude about the mean controlled temperature is reduced by approximately one-sixth that of using aluminum by itself. Because stainless steel has high resistivity and low conductivity, the flow of heat energy into the central portion of the oven is retarded.

Figure 10:
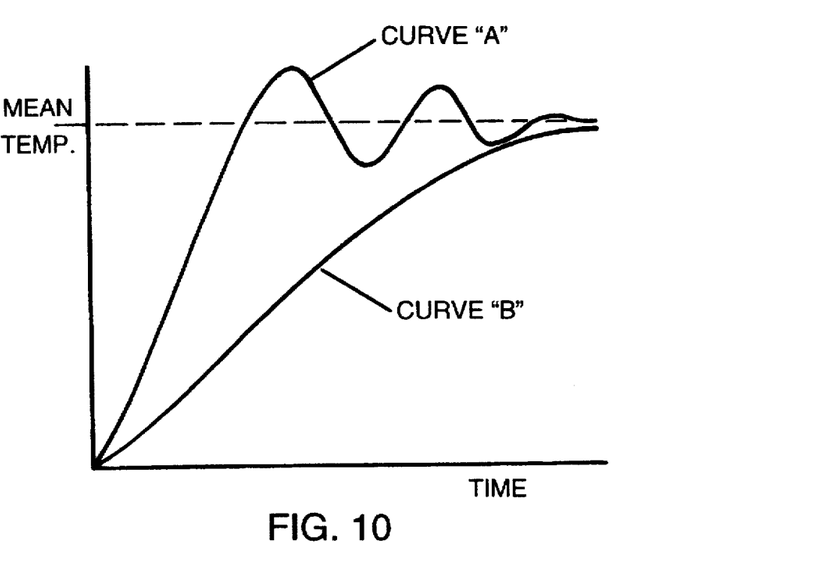
FIG. 10 shows the thermal transient response using the detailed construction of the thermally baffled oven.

FIG. 10 shows the thermal transient response using the detailed construction of the thermally baffled oven. Curve "A" shows the temperature of the aluminum conducting panels and curve "B" shows the temperature at the inner wall of the stainless steel oven chamber.

By using this novel detailed construction, there is less temperature fluctuation, which results in having the moisture with the oven chamber be in equilibrium with the moisture content of the food product being cooked. The food being prepared and cooked in this newly designed oven is found to be more tender and tastier, with less shrinkage.

Programmable Controller

Figure 11:
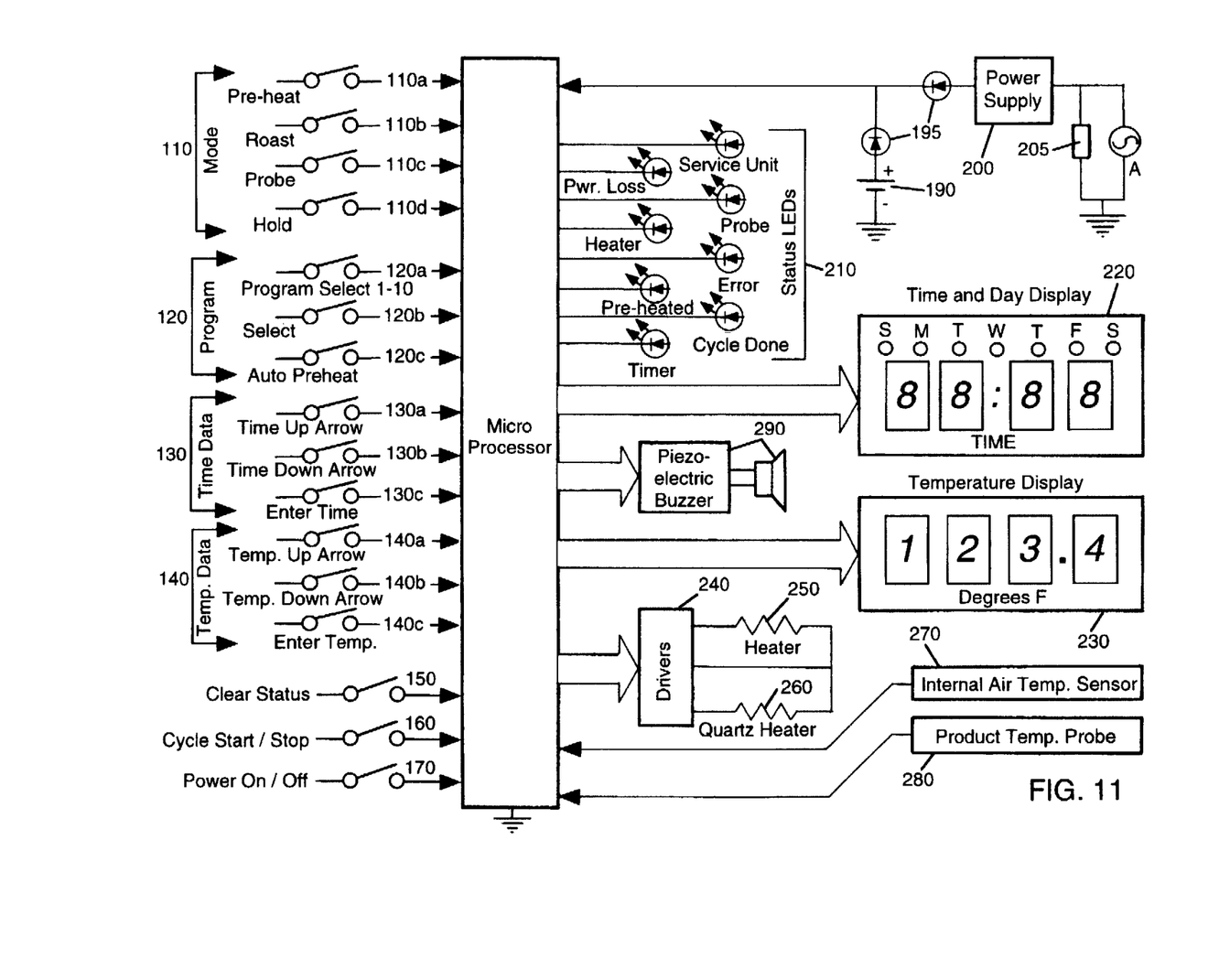
FIG. 11 shows the block diagram of the programmable oven in a preferred embodiment of the present invention.

The programmable oven system consists of a well insulated oven that uses a microprocessor based control board to control the current flowing into a bank heating elements. The amount of heat flowing into the oven chamber is determined by the amount of current flowing through the heating elements. A computer program calculates the required flow of current to produce the desired temperature as determined by the temperature sensors. Temperature control of the oven is established by the two temperature sensors, 270 and 280; one that measures the internal air temperature 270, the other, a thermal probe 280 that is inserted into the product.

Referring to FIG. 11, shown is the microprocessor 180, which is the heart of the control system, typically, a Motorola MC68705R5S. This microprocessor provides 24 bi-directional I/O lines and 8 unidirectional I/O lines. The internal EEPROM memory stores the program code which executes the code as described herein. An internal 4 channel Analog-to-Digital Converter (ADC) digitizes the temperatures as sensed by the various temperature probes and sensors.

Power for the microprocessor 180 is supplied by either the DC Power Supply 200 or by an internal long-lasting Lithium battery 190, which provides the battery back-up should there be a power failure. Steering disconnect diodes 195 furnish the isolation between the two sources of power. In typical operation the voltage supplied by the Lithium back-up cell 190 is 3.6 volts, where the normal power supply output voltage is at 5 volts. When the power supply 200 is active and on, diodes 195 effectively block any flow of current from back-up battery 190.

Transient surge voltage protection is provided by Varistor 205 that is connected across the AC source voltage at the input of the DC power supply 200.

Four Mode switches 110 connect to the input of the microprocessor 180 to provide the selection of four operational functions: Preheat, Roast, Probe and Hold. These Mode push-button switches can select operation in either the manual mode or automatic mode. To operate in the automatic mode, the mode switches 110 provide a means of programming the cooking sequence.

The bank of Program Select Switches 120a allows the user to interact with the microprocessor 180 to establish their own program selections that are most frequently used. First, the user selects the program storage area by selecting one of ten available storage selections. Then the user decides if he wishes to select the Auto Preheat function 120c.

After the program sequence is entered into the microprocessor, the user then depresses the Select switch 120b to store the cooking sequence into memory. To make this data entry, the switch must be depressed for at least 3 seconds. Upon the successful completion of the program entry, the microprocessor responds by beeping three times. This method of interaction between the user and microprocessor provides for a user friendly transaction. Thus the stigma that many users have when operating a computer is minimized.

Switch bank 130 permits the user to set or explore the Time information. An Up Arrow push-button 130a and a Down Arrow push-button 130b scroll the data that is stored in memory to present it on the Time Display 220.

The stored Temperatures can be set or explored by the user activating the switches in switch bank 140. Also associated in this switch bank are up and down push-buttons to scroll the Temperature Display 230.

A bank of Status LEDs 210 displays the current status of the oven's activity. What is shown are: "Service Unit, Power Loss, Probe, Heater, Error, Preheat, Cycle Done and Timer." The status is reset by depressing the Clear Status push-button 150.

Auxiliary support switches 160 and 170 furnish additional convenience functions, such as, Cycle Start and Stop push-button 160 and Power On and Off push-button 170.

The oven control is comprised of the control algorithm that is stored in the microprocessor memory. The input sensors are two thermal probes that sense (1) the internal air temperature 270 and (2) the product temperature 280. Each of the temperature sensors is connected to its respective ADC channel. The microprocessor 180 has up to four ADC inputs available.

A set of solid state drivers 240 control the current flowing to the main heater 250 and to the quartz heater array 260. Control is governed by temperature sensed by each sensor that is in control at the time of use. If the temperature that is sensed is too low more current flows into the respective heater in control. Conversely, if the temperature that is sensed is too great, less current flows through the heater in control.

Figure 12:
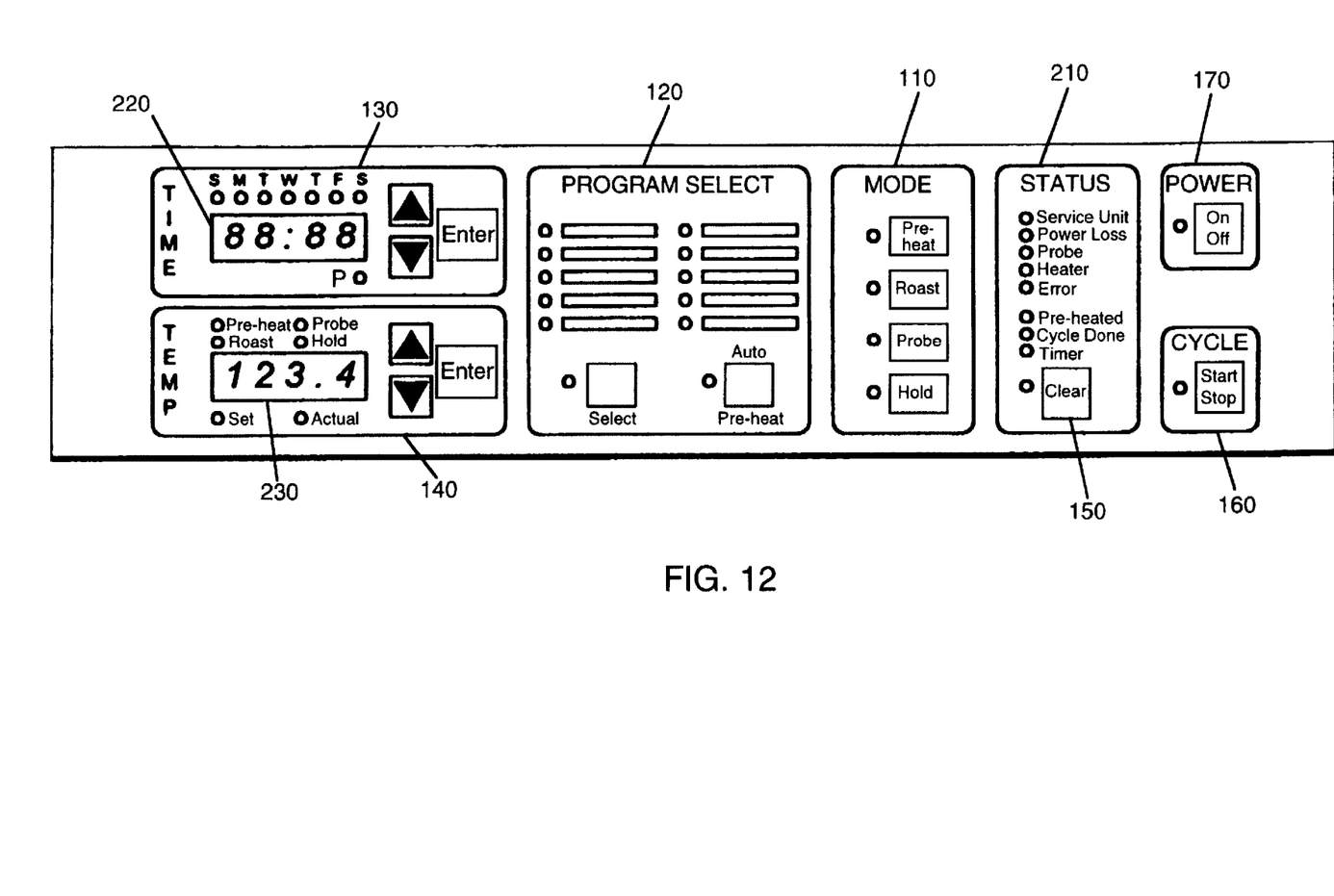
FIG. 12 shows a flow diagram which details an example of the programming function that typifies the user programming interface.

Turning now to FIG. 12, shown is an ergonomically designed front panel arrangement for the programmable oven. Each of the groupings provides an intuitive response from even a novice, such as one who has had little or no experience in operating computerized equipment. The major groupings are: the Power On and Off selection 170, The Cycle Start and Stop selection 160, the Status Indicator LEDs 210, the Mode selectors 110, the Program selectors 120, the Time and Day group 130, and the Temperature group 140.

The Time and Day section of the operators console 130 shows the time that is displayed on the 4 digit LCD time display 220. Located directly above the time display 220 is an array of seven LED lamps that correspond to each day of the week, thereby giving the operator the present day.

In the self-analysis mode of operation the appropriate LED will light showing the day when a particular failure occurred. The use of the Up and Down Arrow push-buttons 130a and 130b will scroll the display showing the various times stored in memory.

The same is also true for the Temperature section 140 of the operators console. Each stored temperature can be displayed on the 4 digit LCD display 230 by scrolling the appropriate Up and Down Arrow keys 140a and 140b. Located directly above the LCD Temperature display 230 are 4 LED indicators that show which of the four cooking cycles is in progress. These lamps also verify the stored cycles of: Preheat, Roast, Probe and Hold. The two push-buttons directly below the temperature display are the Set and Actual buttons. Depressing the Set button will display the Set Temperature and pushing the Actual button will display the Actual Temperature reading.

Programming Example

Figure 13:
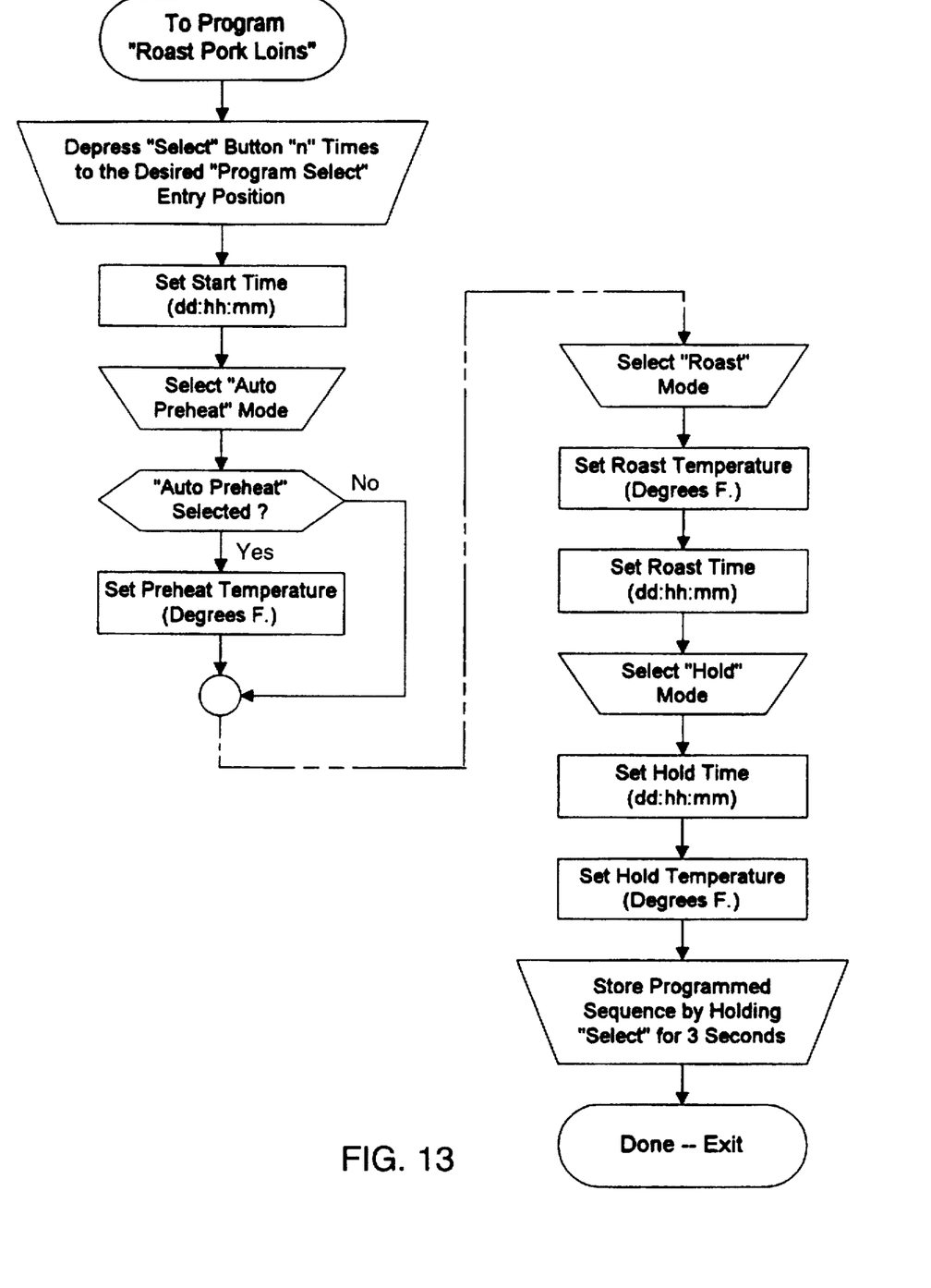
FIG. 13 shows the front panel arrangement of the preferred embodiment of the programmable oven.

Referring to the flowchart shown FIG. 13, an illustrative programming example is given to demonstrate a typical programming sequence that may be used for cooking a Roast Pork Loin. Programming the computer is no longer accomplished by writing many lines of code and entering them into the computer memory. The programming is done by interactively depressing the front panel push-buttons in the desired instruction flow sequence.

To start the programming sequence, the user first depresses the Select push-button "n" times until the desired "Program Select" area is reached. For each push of the Select push-button, the next LED in sequence is illuminated showing the current program area. For convenience the user can write "Pork Loin" on the front panel, identifying the new program.

Next, the user enters the Start Time by scrolling the Time Display 220 with the Up Arrow and Down Arrow push-button switches, 130a and 130b respectively. Depressing the Enter push-button advances the display to the next digit. When the last digit is entered into the display, the program sequence automatically advances to Date display. The date advance with each push of the Enter push-button. When the Time and Date entry is accurate and complete, depressing the Enter push-button for at least 3 seconds will store the data into memory.

The user can then select the "Auto Preheat" mode if so desired. If the "Auto Preheat" function is selected, the user then enters the desired preheat temperature. Entering the temperature is the same data entry process as described in setting the Time and Date, as found in the preceding paragraph.

The Roast function is subsequently selected by depressing push-button 110b. The user now enters the Time and Temperature as was previous described in the preceding paragraphs.

The Hold function is activated by pushing the Hold push-button 110c. The Hold Temperature and the Hold Time can now be entered.

Upon completion of the data entry programming session, the entire program sequence is stored into memory by depressing and holding the Select push-button for at least 3 seconds. A successful data entry is acknowledged by the microprocessor by issuing three consecutive beeps on piezoelectric buzzer 290.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular suggestion or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. An upstanding oven cabinet having a compartment to cook and hold comestible foods with at least one door for access to the compartment, an oven circuit with a heater means and an energy source with electric current to the oven, comprising:

a heat sink comprising a first material characterized by a high thermal capacity, and a heat conductor comprising a second material characterized by a high thermal conductivity, the heater means contacting the first material and further in contact with the second material;

wherein the heater means comprises heating element including a Nichrome wire wrapped around and insulated with mica, and sheathed in a metal jacket; and, an inner chamber formed by a thermal baffle to smooth out heat flow and minimize heat variations within the chamber.

2. The oven for comestible foods according to claim 1, wherein the metal jacket comprises a Calrod unit.

3. The oven for comestible foods according to claim 2, wherein first material is comprises stainless steel.

4. The oven for comestible foods according to claim 3, wherein the second material comprises aluminum.

5. The oven for comestible foods according to claim 4, further comprising a heater mounting clamp associated with the oven.

6. The oven for comestible foods according to claim 5, wherein the clamp comprises a mounting plate with brackets dimensioned to receive the heater means, adapted to secure the heater means against the heat conductor and prevent the heater means from bowing away from the conductor.

7. The oven for comestible foods according to claim 6, wherein the heater means and the associated mounting plate with brackets form a heat sink.

8. The oven for comestible foods according to claim 7, further comprising a plurality of temperature sensors on the circuit in communication with the heat sink, whereby the oven is controlled to attain a desired temperature.

9. The oven for comestible foods according to claim 8, wherein the thermal baffle comprises stainless steel.

10. The oven for comestible foods according to claim 9, further comprising a means for creating a natural convection current within the cabinet, said means for creating a natural convection current comprises the conductor, constructed of opposed L-shaped pieces, each of the L-shaped pieces having an upright leg and a contiguous foot portion, with the heater means affixed to the cabinet under the juncture of the foot and the leg of each L piece, and the leg of each L-shaped piece draws heat up the sidewall of the conductor and away from the central floor portion of the cabinet, to create a convection heat flow within the cabinet, that enhances temperature control for reducing temperature variations within the oven.

11. The oven for comestible foods according to claim 10, wherein each of the L-shaped aluminum pieces is rigidly coupled to the stainless steel inner chamber, whereby the high resistivity and low conductivity of the stainless steel effectively holds moisture and water vapor in equilibrium in the oven for enhanced tenderness with reduced shrinkage of a comestible food product.

12. The oven for comestible foods according to claim 11, wherein the mass of the stainless steel compartment is more than 2 times the mass of the L-shaped aluminum pieces, thereby smoothing the flow of thermal energy in the oven.

13. The oven for comestible foods according to claim 12, each heating element having an operating temperature that is the same, whereby the thermal gradient between the heating elements is essentially zero, resulting in no flow of heat energy between them.

14. The oven for comestible foods according to claim 13, wherein the L-shaped aluminum pieces are not one contiguous material, but the foot portions of the L-shaped pieces are welded together to form a U-shaped heat conductor section.

15. The oven according to claim 14, wherein the oven has a generally rectangular shape and further comprises outer oven walls, an inner skin forming the oven compartment, and at least one door for access to the compartment.

16. The oven according to claim 15, wherein the compartment inner skin is separated from the oven walls by an insulation.

17. The oven according to claim 16, wherein the insulation is fiberglass insulation.

18. The oven according to claim 17, further comprising a multi-level, multi-functional programmable controller on the circuit, the controller having a microprocessor with a memory communicating with a front panel control board for interactively programming oven operation in real-time by controlling the current to the heating elements, and further communicating with a modem for remote programming by use of a conventional personal computer.

19. The oven according to claim 18, further comprising a power management system on the circuit for memory storage of power outages, a duration thereof, and an internal oven temperature consequent to each said outage, with an alarm indicator to provide a warning that a power supply fault has occurred.

20. The oven according to claim 19, further comprising a probe communicating on the circuit and the probe inserted into a food item to determine an internal temperature of the food item and to automatically start a cooking cycle when the internal temperature exceeds a predetermined temperature.

21. The oven according to claim 20, further comprising a battery for backup power for the microprocessor and memory in the event of an interruption in power to the oven.

22. The oven according to claim 21, further comprising functional modes of operation that include a mode for roasting and baking, a mode for holding at temperature and a mode for proofing of food items.

23. The oven according to claim 22, further comprising a thermal input into the oven chamber that is dependent on the current flowing through the heating elements.

24. The oven according to claim 23, the plurality of temperature sensors further comprising a first sensor for measuring an internal oven air temperature; and a second sensor associated with the probe for directly measuring the internal temperature of the food item.

25. The oven according to claim 24, the microprocessor having a program that calculates the current required to produce the desired temperature as determined by the temperature sensors.

26. The oven according to claim 25, further comprising a plurality of steering diodes to establish isolation between the two power sources.

27. The oven according to claim 26, further comprising a varistor that is connected across an AC source voltage at the input of the DC power supply to provide transient surge voltage protection.

28. The oven according to claim 27, further comprising four mode switches connected to the microprocessor to provide a selection of four operational functions that include preheat, roast, probe and hold, that can be selected by either a manual or automatic means.

29. The oven according to claim 28, further comprising a means to program oven operation in automatic mode.

30. The oven according to claim 29, wherein the means to program oven operation in automatic mode comprises program select switches on the control panel, the program select switches serving as inputs to the microprocessor for selection and storage of a cooking sequence in the microprocessor memory.

31. The oven according to claim 30, further comprising a means for self-analyzing oven operations.

32. The oven described in claim 31, wherein the means for self-analyzing oven operations comprises in combination, a plurality of time data select switches and a time display having up and down push-buttons adapted for scrolling the time display to show the various times stored in memory; a plurality of temperature select switches and a temperature display having up and down push-buttons adapted for scrolling the temperature display to show the various temperatures stored in memory; a plurality of status LED's with display indicators showing a current status of oven activity and a clear status button for status reset.

33. The oven of claim 32, wherein the control panel further comprises cycle start and stop push-buttons, power on and power off push-buttons.

34. The oven according to claim 33, wherein the microprocessor comprises a Motorola MC 68705R5S.

35. The oven according to claim 34, wherein the microprocessor comprises 24 bi-directional I/O lines and 8 uni-directional I/O lines.

36. The oven according to claim 35, wherein the microprocessor memory comprises an EEPROM memory which stores the control algorithm program code and executes the code.

37. The oven according to claim 36, the heating elements further comprising a bank of quartz lamps.

38. A programmable oven for preparation of comestibles, comprising:

a one-piece, free standing oven cabinet having a chamber adapted to be heated by a plurality of heater elements to a designated chamber temperature, an oven circuit with a bank of heating elements in the circuit for providing heat to the chamber, and a means for protection against a transient surge voltage said means for protection connected across an AC source voltage at the input of a first DC power supply for providing a current to the circuit and to the elements;

a microprocessor with a memory and an ADC converter with a plurality of ADC input channels, the microprocessor communicating with the first power supply and with a second back-up power supply through steering diodes for isolation between the first and said second power supply, the diodes adapted to block current flow from the back-up power supply when the first power supply is active; and, means for controlling chamber temperature associated with the microprocessor.

39. The programmable oven of claim 38, wherein the means for controlling comprises a control algorithm which is stored in the microprocessor memory and first temperature sensor to measure the chamber temperature and a second temperature sensor comprising a thermal probe associated with a food product within the chamber for measuring internal temperature of the product, the first and second temperature sensors connected to a respective ADC channel of the plurality for inputs to the microprocessor;

a plurality of solid state drivers on output from the microprocessor for controlling current flow to the heater elements.

40. The programmable oven in claim 39, wherein said means for protection against a transient surge voltage is a Varistor.

41. The programmable oven as described in claim 40, further comprising a means to select operation in a manual mode.

42. The programmable oven described in claim 41, wherein the means to select operation in manual mode comprises a control panel having a plurality of mode switches as inputs to the microprocessor for selection among a plurality of oven operating functions.

43. The programmable oven according to claim 42, further comprising a means to program oven operation in automatic mode.

44. The programmable oven in claim 43, wherein the means to program oven operation in automatic mode comprises program select switches on the control panel, the program select switches serving as inputs to the microprocessor for selection and storage of a cooking sequence in the microprocessor memory.

45. The programmable oven for preparation of comestibles as described in claim 44, further comprising a means for audible output from the microprocessor upon successful completion of the program entry, the four mode switches, program switches and audible output serving as a user friendly interface with an operator of the oven.

46. A process for programming a programmable oven having capabilities integrated therein for cooking, holding, and proofing comestible foods, the oven comprising an oven cabinet having a chamber adapted to be heated by a plurality of heater elements to a designated chamber temperature, an oven circuit with a bank of heating elements in the circuit for providing heat to the chamber, and a means for protection against a transient surge voltage said means for protection connected across an AC source voltage at the input of a first DC power supply for providing a current to the circuit and to the elements;

an oven controller comprising a microprocessor with a memory, a modem, and an ADC converter with a plurality of ADC input channels, the microprocessor communicating with the first power supply and with a second back-up power supply through steering diodes for isolation between the first and said second power supply, the diodes adapted to block current flow from the back-up power supply when the first power supply is active;

means for controlling chamber temperature associated with the microprocessor; the means for controlling comprises a control algorithm which is stored in the microprocessor memory and first temperature sensor to measure the chamber temperature and a second temperature sensor comprising a thermal probe associated with a food product within the chamber for measuring internal temperature of the product, the first and second temperature sensors connected to a respective ADC channel of the plurality for inputs to the microprocessor;

a plurality of solid state drivers on output from the microprocessor for controlling current flow to the heater elements;

wherein said means for protection against a transient surge voltage is a Varistor;

wherein the microprocessor comprises 24 bi-directional I/O lines and 8 unidirectional I/O lines;

further comprising a means to select operation in a manual mode, the means to select operation in manual mode comprising a control panel having a plurality of mode switches as inputs to the microprocessor for selection among a plurality of oven operating functions; said plurality of mode switches comprising four mode switches for selection among the four oven operating functions, preheat, roast, probe and hold modes, as inputs to the microprocessor;

a means to program oven operation in automatic mode, including remote programming via the modem by use of a personal computer;

wherein the means to program oven operation in automatic mode comprises program select switches on the control panel, the program select switches serving as inputs to the microprocessor for selection and storage of a cooking sequence in the microprocessor memory;

the oven further comprising a means for audible output from the microprocessor upon successful completion of the program entry, the four mode switches, program switches and audible output serving as a user friendly interface with an operator of the oven;

further comprising a means for self-analyzing oven operations, said means for self-analyzing comprising in combination, a plurality of time data select switches and a time display having up and down push-buttons adapted for scrolling the time display to show the various times stored in memory; a plurality of temperature select switches and a temperature display having up and down push-buttons adapted for scrolling the temperature display to show the various temperatures stored in memory; a plurality of status LED's with display indicators showing a current status of oven activity and a clear status button for status reset;

the oven further comprising a means to reset the current status of oven activity following self-analyzing oven operations;

wherein the means to reset the current status of oven activity comprises a clear status button of the control panel;

wherein the control panel further comprises cycle start and stop push-buttons, power on and power off push-buttons;

further comprising a set button for display of the set temperature and an actual button to display the actual temperature reading;

the plurality of heater elements comprising Calrod heating elements and a bank of quartz lamps, comprising the steps of:

depressing a Select push-button "n" times until a desired "Program Select" area is reached, whereby for each push of the Select push-button, the next LED in sequence is illuminated showing the current program area;

entering the Start Time by scrolling the Time Display with Up Arrow and Down Arrow push-button switches respectively;

depressing the Enter push-button to advance the display to the next digit, whereby when the last digit is entered into the display, the program sequence automatically advances to Date display and the date advances with each push of the Enter push-button;

depressing the Enter push-button for at least 3 seconds to store the data into memory when the Time and Date entry is accurate and complete;

selecting the "Auto Preheat" mode if so desired;

entering the desired preheat temperature if the "Auto Preheat" function is selected;

entering the temperature by the same data entry process;

selecting the oven mode function by depressing the appropriate mode push-button;

entering the Time and Temperature selections;

activating a Hold function pushing the Hold push-button;

entering the Hold Temperature and the Hold Time;

depressing and holding the Select push-button for at least 3 seconds to store the entire program into memory;

issuing three consecutive beeps on piezoelectric buzzer upon completion of the data entry program, for acknowledgement by the microprocessor that the data entry was successful.

* * * * *